(12) United States Patent
Kang et al.

(10) Patent No.: US 12,719,304 B2
(45) Date of Patent: Aug. 25, 2026

(54) UNINTERRUPTIBLE POWER SUPPLY DEVICE HAVING INDEPENDENT BYPASS FUNCTION

(71) Applicant: SINAENG CO., LTD., Gyeonggi-do (KR)

(72) Inventors: Byong Hee Kang, Seoul (KR); Jae Sok Gho, Chungcheongnam-do (KR); Young Lok Lee, Gyeonggi-do (KR)

(73) Assignee: SINAENG CO., LTD., Gyeonggi-do (KR)

( * ) Notice: Subject to any disclaimer, the term of this patent is extended or adjusted under 35 U.S.C. 154(b) by 0 days.

(21) Appl. No.: 18/555,709

(22) PCT Filed: May 24, 2022

(86) PCT No.: PCT/KR2022/007359
§ 371 (c)(1),
(2) Date: Oct. 16, 2023

(87) PCT Pub. No.: WO2022/255711
PCT Pub. Date: Dec. 8, 2022

(65) Prior Publication Data

US 2024/0204562 A1 Jun. 20, 2024

(30) Foreign Application Priority Data

Jun. 1, 2021 (KR) ........................ 10-2021-0071150

(51) Int. Cl.
*H02J 9/06* (2006.01)

(52) U.S. Cl.
CPC .............. *H02J 9/062* (2013.01); *H02J 9/068* (2020.01)

(58) Field of Classification Search
CPC .. H02J 9/062; H02J 9/068; H02J 9/06; H01H 9/54
See application file for complete search history.

(56) References Cited

U.S. PATENT DOCUMENTS 6,292,379 B1 * 9/2001 Edevold .................... H02J 9/06 363/71
7,061,141 B2 * 6/2006 Yamamoto ................ H02J 3/46 307/65

(Continued)

FOREIGN PATENT DOCUMENTS

JP 07003829 Y * 1/1995
JP 09-056087 A 2/1997

(Continued)

OTHER PUBLICATIONS

Korean Intellectual Property Office, English translation of International Search Report for International Application No. PCT/KR2022/007359, mailed Sep. 2, 2022, 2 pages.

*Primary Examiner* — Rexford N Barnie
*Assistant Examiner* — Rasem Mourad
(74) *Attorney, Agent, or Firm* — LICA, Inc.

(57) ABSTRACT

The present invention relates to an uninterruptible power supply device comprising: a first switch for connecting an output of an inverter to a load; a second switch for connecting a bypass line to the load; and an STS control unit for controlling operations of the first switch and the second switch, wherein: the first switch includes a power switching semiconductor capable of performing active switching control; the second switch includes an SCR switch and a power switching semiconductor capable of performing active switching control, the SCR switch and the power switching semiconductor being connected to each other in parallel; and when an anomaly occurs in the inverter, the STS control unit causes an off signal to be applied to a gate of the power switching semiconductor of the first switch, which can perform active switching control, and simultaneously causes the SCR switch of the second switch to be turned on first and then the power switching semiconductor capable of per- (Continued)

forming active switching control to be sequentially turned on.

9 Claims, 6 Drawing Sheets

(56) References Cited

U.S. PATENT DOCUMENTS

| | | | | |
|---|---|---|---|---|
| 2003/0184160 | A1 * | 10/2003 | Yamamoto | H02J 9/062 307/64 |
| 2006/0221523 | A1 * | 10/2006 | Colombi | H02M 7/493 361/90 |
| 2014/0077604 | A1 * | 3/2014 | Shibata | H02S 40/38 307/66 |
| 2014/0132074 | A1 | 5/2014 | Bush et al. | |
| 2015/0054451 | A1 * | 2/2015 | Rokusek | H02M 7/23 320/108 |
| 2019/0115636 | A1 * | 4/2019 | Remboski | G01R 31/382 |
| 2020/0014241 | A1 * | 1/2020 | Toyoda | H02J 9/062 |
| 2021/0036698 | A1 * | 2/2021 | Nakano | H03K 17/0824 |
| 2021/0273440 | A1 * | 9/2021 | Kang | H01L 21/67 |
| 2021/0305840 | A1 * | 9/2021 | Wu | H02J 9/061 |

FOREIGN PATENT DOCUMENTS

| | | | | |
|---|---|---|---|---|
| KR | 10-2015-0106838 | A | | 9/2015 |
| KR | 1020160001972 | A | * | 1/2016 |
| KR | 10-2018-0096090 | A | | 8/2018 |

* cited by examiner

UNINTERRUPTIBLE POWER SUPPLY DEVICE HAVING INDEPENDENT BYPASS FUNCTION

CROSS-REFERENCE TO RELATED APPLICATIONS

The present application is a U.S. national stage application of International Application No. PCT/KR2022/007359, filed May 24, 2022, which claims priority to and the benefit of Korean Application No. 10-2021-0071150, filed Jun. 1, 2021, the contents of which are incorporated herein by reference and made a part hereof.

BACKGROUND

Field

The present invention relates to an uninterruptible power supply (UPS) having an independent bypass function, which performs a stable high-speed operation and enables rapid transfer to a bypass line regardless of the phase of a voltage or current.

Related Art

Power used in semiconductor manufacturing processes, bio and chemical processes, and the like needs to be supplied to important loads at all times without interruption such that the stability of power supplied to the entire process is maintained.

Uninterruptible power supply devices are widely used to supply power to very sensitive loads, and in order to ensure the stability of supplied power, power is normally supplied to a load through an inverter in an uninterruptible power supply device, and if the inverter has an error or needs to be repaired, power needs to be stably supplied to the load through a bypass line.

In the case of a conventional uninterruptible power supply device, commutation is inevitable in a transfer circuit using a thyristor, which is also called a silicon controlled rectifier (SCR) switch, in operating as a bypass line at an inverter output due to instability or momentary overload of an internal inverter of the uninterruptible power supply device, and thus a method of preventing damage due to current by receiving the current through a voltage sensor or a current sensor or setting a time period in which both switches are turned off for a certain period of time in order to switch a thyristor for connecting an inverter output to a load to a thyristor for connecting a bypass line is adopted.

However, such a method may cause overcurrent from a bypass line to an inverter during commutation due to calculation errors caused by an offset and the like, and thus there is a problem that switching to the bypass line is considered to be a very difficult choice for users.

Additionally, to prevent this, damage due to overcurrent can be prevented by maintaining more than half a cycle in which the two thyristor switches are turned off, but the power applied to the load is off for 8 ms or longer, and thus in the case of a power-sensitive load, a problem of load system shutdown may occur.

Korean Patent No. 10-1493774 relates to a bypass switch circuit of an uninterruptible power supply device including a momentary power interruption compensation device. The uninterruptible power supply device turns on an SCR switch to supply external power to a load when the external power is normal, and when an abnormality occurs in the external power, cuts off the SCR switch, operates an inverter for receiving power from a battery and supplies the power from the battery to the load. In a case in which control of the uninterruptible power supply device is abnormal or disabled, a pulse circuit is operated to turn on the SCR switch such that the external power is supplied to the load. However, there is a problem in that it is difficult to cut off the SCR switch when control of the uninterruptible power supply device returns to a normal state.

Registered Patent Publication No. 10-2039888 relates to a power transfer switch, in which a first switching element and a second switching element are turned on or off by a drive controller such that power from an uninterruptible power supply device or backup power is supplied to semiconductor manufacturing process equipment in order to stable backup power without interruption when output power of the uninterruptible power supply device supplied to the semiconductor manufacturing process equipment is unstable, but there is a problem in that the first switching element and the second switching element are merely components for connecting the uninterruptible power supply device and the external backup power to loads and there is no specific indication of a configuration for connecting bypass power inside the uninterruptible power supply device.

Registered Patent Publication No. 10-2126209 relates to an overcurrent protection power transfer switch, in which even if short-circuiting occurs in a part of semiconductor manufacturing process equipment, an SCR switch and a field effect transistor bidirectional switch of a second switching element are sequentially turned on in order to turn off a first switching element and turn on the second switching element by a drive controller for the purpose of supplying stable backup power to the remaining semiconductor manufacturing process equipment without interruption, but there is a problem in that the first switching element and the second switching element are merely components for connecting the uninterruptible power supply device and the external backup power to loads and there is no specific indication of a configuration for connecting bypass power inside the uninterruptible power supply device.

SUMMARY

To solve the above problems, an object of the present invention is to ensure that a normal voltage is always supplied to a load even when an internal inverter of an uninterruptible power supply device fails in a case where power is supplied to a sensitive and important power.

Another object of the present invention is to improve the reliability of an uninterruptible power supply device by independently turning on/off a switch for connecting the output of an internal inverter of the uninterruptible power supply device to a load and a switch for connecting a bypass line to the load within a short time regardless of commutation.

Another object of the present invention is to achieve a stable operation at a high speed, enable rapid transfer regardless of the phase of a voltage or current, and prevent short-circuit due to simultaneous connection of power connected by a bypass function and power input from an inverter in advance.

Another purpose of the present invention is to reduce a burden on both a developer and an operator due to transfer between power connected by the bypass function and power input from an inverter and minimize interruption of power supply by extending an allowable range for synchronization of an uninterruptible power supply device.

Another purpose of the present invention is to resolve system instability caused by commutation failure in relation to a bypass line of a conventional uninterruptible power supply device.

Another purpose of the present invention is to achieve independent and rapid transfer to a bypass line of an uninterruptible power supply without relying on a voltage or current sensor regardless of the phase of a voltage or current.

The objects to be accomplished by the present invention are not limited to the above objects, and other objects that are not specified may be additionally considered within the scope that can be easily inferred from the following detailed description and effects thereof.

The present invention includes the following configuration to accomplish the above-described objects.

The present invention relates to an uninterruptible power supply device including: a first switch for connecting an output of an inverter to a load; a second switch for connecting a bypass line to the load; and an STS control unit configured to control operations of the first switch and the second switch, wherein the first switch includes a power switching semiconductor capable of active switching control, the second switch includes a power switching semiconductor capable of active switching control and an SCR switch which are connected in parallel with each other, and the STS control unit performs control such that an off signal is applied to a gate of the power switching semiconductor capable of active switching control of the first switch, and simultaneously the SCR switch of the second switch is turned on first and then the power switching semiconductor capable of active switching control is sequentially turned on when an abnormality occurs in the inverter.

When an abnormality occurs in the inverter, the STS control unit of the present invention performs control such that the off signal is applied to the gate of the power switching semiconductor capable of active switching control of the first switch, and simultaneously the SCR switch of the second switch is turned on first and then the power switching semiconductor capable of active switching control is sequentially turned on in a state in which a circuit breaker CB4 of the bypass line is turned on.

The second switch of the present invention further includes a mechanical switch, the mechanical switch being connected in parallel with the power switching semiconductor capable of active switching control and the SCR switch of the second switch, and the STS control unit performs control such that the off signal is applied to the gate of the power switching semiconductor capable of active switching control of the first switch, and simultaneously the SCR switch, the mechanical switch, and the power switching semiconductor capable of active switching control of the second switch are sequentially turned on when an abnormality occurs in the inverter.

The STS control unit of the present invention performs control such that the SCR switch, the mechanical switch, and the power switching semiconductor capable of active switching control of the second switch are sequentially turned on, and then the SCR switch and the mechanical switch are turned off and the power switching semiconductor capable of active switching control is maintained in a turn on state.

The mechanical switch of the present invention is a relay or magnetic contactor (MC).

Furthermore, the present invention relates to a method of operating an uninterruptible power supply device including a first switch for connecting an output of an inverter to a load, a second switch for connecting a bypass line to the load, and an STS control unit configured to control operations of the first switch and the second switch, the first switch including a power switching semiconductor capable of active switching control, the second switch including a power switching semiconductor capable of active switching control and an SCR switch which are connected in parallel with each other, the method including: a first step (S100) in which the STS control unit performs control such that an off signal is applied to a gate of the power switching semiconductor capable of active switching control of the first switch, and simultaneously, the SCR switch of the second switch is turned on first and then the power switching semiconductor capable of active switching control is sequentially turned on when an abnormality occurs in the inverter; and a second step (S200) in which the STS control unit performs control such that the SCR switch, the mechanical switch, and the power switching semiconductor capable of active switching control of the second switch are sequentially turned on, and then the SCR switch and the mechanical switch are turned off and the power switching semiconductor capable of active switching control is maintained in a turn on state.

Furthermore, the present invention may be a computer program stored in a storage medium to execute the method of operating an uninterruptible power supply device.

Advantageous Effects

An effect of the present invention is to ensure that a normal voltage is always supplied to a load even when an internal inverter of an uninterruptible power supply device fails in a case where power is supplied to a sensitive and important power.

Another effect of the present invention is to improve the reliability of an uninterruptible power supply device by independently turning on/off a switch for connecting the output of an internal inverter of the uninterruptible power supply device to a load and a switch for connecting a bypass line to the load within a short time regardless of commutation.

Another effect of the present invention is to achieve a stable operation at a high speed, enable rapid transfer regardless of the phase of a voltage or current, and prevent short-circuit due to simultaneous connection of power connected by a bypass function and power input from an inverter in advance.

Another effect of the present invention is to reduce a burden on both a developer and an operator due to transfer between power connected by the bypass function and power input from an inverter and minimize interruption of power supply by extending an allowable range for synchronization of an uninterruptible power supply device.

Another effect of the present invention is to resolve system instability caused by commutation failure in relation to a bypass line of a conventional uninterruptible power supply device.

Another effect of the present invention is to achieve independent and rapid transfer to a bypass line of an uninterruptible power supply without relying on a voltage or current sensor regardless of the phase of a voltage or current.

The effects obtained by the present invention are not limited to the above effects, and other effects that are not specified may be additionally considered within the scope that can be easily inferred from the following detailed description and effects thereof.

DESCRIPTION OF EXEMPLARY EMBODIMENTS

Hereinafter, the overall configuration and operation according to preferred embodiments of the present invention will be described. These embodiments are illustrative and do not limit the configuration and operation of the present invention, and other configurations and operations that are not explicitly shown in the embodiments can also be regarded as the technical idea of the present invention if they are easily understood by those skilled in the art to which the present invention pertains through embodiments below.

In a case in which an uninterruptible power supply device of the present invention supplies power to a sensitive and important load, the interruptible power supply device needs to supply power to the load even under worst conditions, and thus a normal voltage needs to be supplied to the load at all times even when an internal inverter of the uninterruptible power supply device fails.

Therefore, the reliability of the uninterruptible power supply device can be improved by independently and rapidly turning on/off a switch that connects the inverter of the uninterruptible power supply to a load and a switch that connects a bypass line to the load regardless of commutation.

Figure 1:
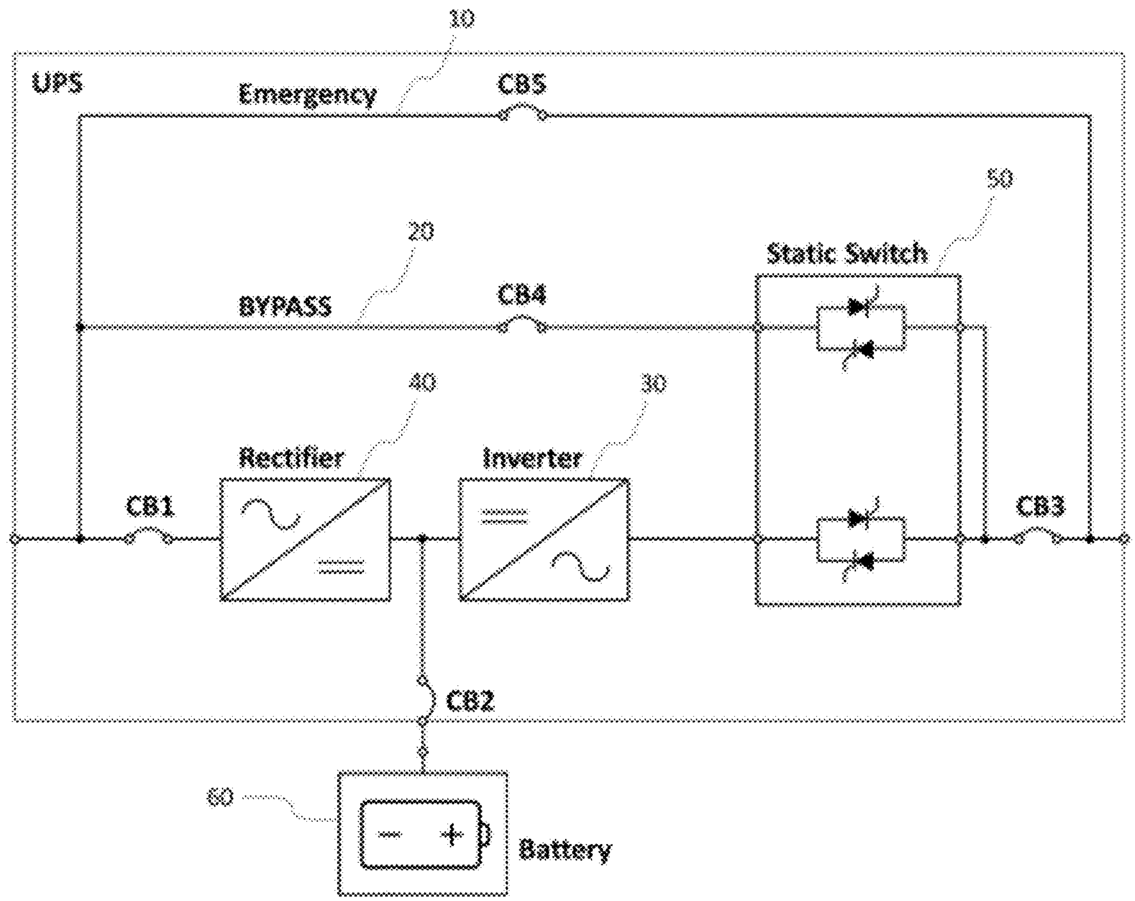
FIG. 1 illustrates an internal configuration of a conventional uninterruptible power supply device.

FIG. 1 illustrates an internal configuration of a conventional uninterruptible power supply device.

Referring to FIG. 1, a typical uninterruptible power supply device has at least three connections by an emergency line 10, a bypass line 20, an inverter 30, and a rectifier 40 to connect one system power source to a load.

In addition to the aforementioned three connections, additional circuit breakers CB1, CB2, CB3, CB4, and CB5 may be included, and for more stable power supply to the load, power supply by another power input may be further provided in addition to power supply by the uninterruptible power supply device.

The uninterruptible power supply device receives alternating current from the system power source and the rectifier 40 converts the alternating current into direct current and supplies the direct current to the inverter 30 or stores the same in a battery 60.

The inverter 30 converts the direct current from the rectifier 40 or the battery 60 into alternating current required by the load and supplies the alternating current.

Meanwhile, in the conventional uninterruptible power supply device, a static switch 50 may operate to cut off the connection of the inverter 30 and the load and connect the bypass line 20 and the load when the inverter 30 fails, but since the static switch 50 is a transfer circuit using a thyristor or an SCR switch in which commutation is inevitable, for switching from a thyristor for connecting the output of the inverter 30 to the load to a thyristor for connecting the bypass line 20 to the load, input needs to be received through a voltage sensor or a current sensor, or a certain period of time in which both switches are turned off needs be provided to prevent damage due to current.

However, in such methods, overcurrent may be generated from the bypass line 20 to the inverter 30 during commutation due to calculation errors caused by an offset and the like, and thus switching to the bypass line 20 through the static switch 50 remains difficult.

Accordingly, in order to prevent generation of overcurrent at the time of switching to the bypass line 20 by the static switch 50, the time period in which the two thyristors of the static switch 50 are turned off may be maintained for more than half a cycle to prevent damage due to overcurrent, but when both of the thyristors are turned off for more than half a cycle, the power applied to the load is cut off for 8 ms or longer, and thus the load system is shut down in the case of a load sensitive to power, which will inevitably result in massive losses in semiconductor manufacturing processes, bio and chemical processes, and the like.

Figure 2:
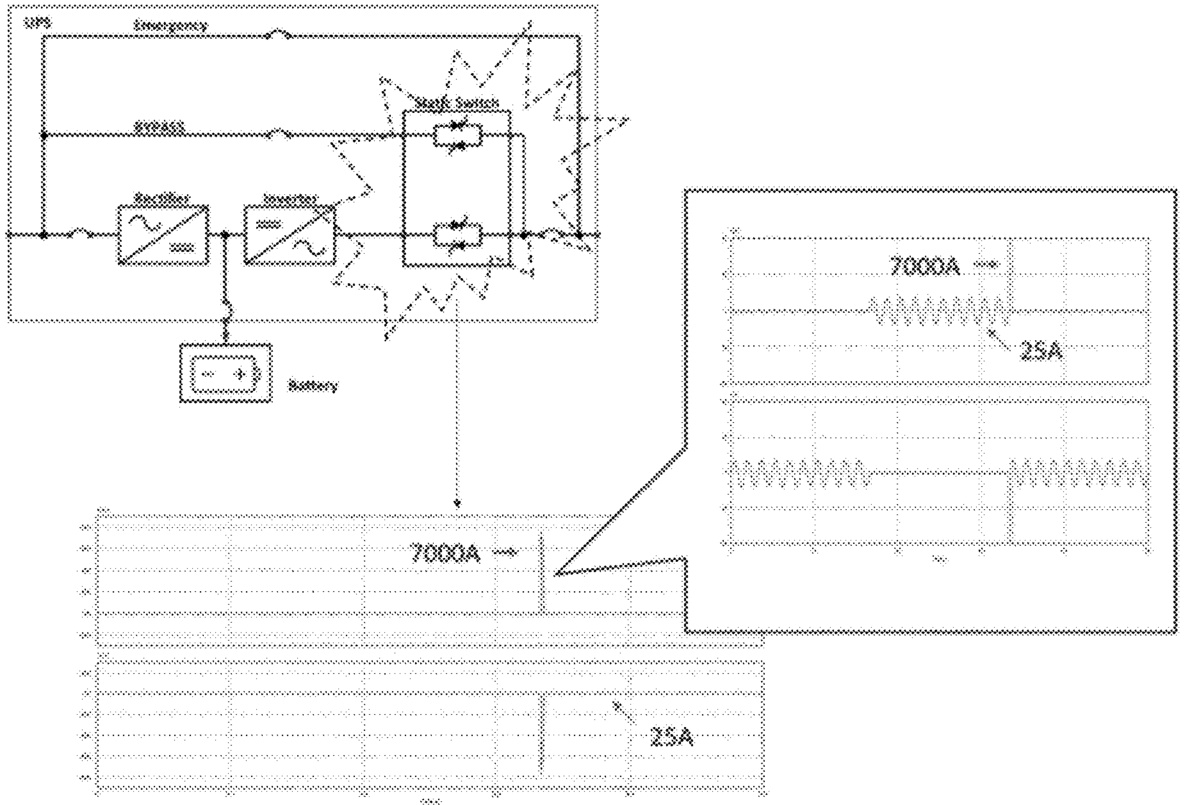
FIG. 2 illustrates a case in which a short-circuit current is generated during operation of the conventional uninterruptible power supply device.

FIG. 2 illustrates a case in which a short-circuit current is generated during operation of the conventional uninterruptible power supply device.

Referring to FIG. 2, although the static switch 50 can operate to cut off the connection between the inverter 30 and the load and connect the bypass line 20 and the load when the inverter 30 fails in the conventional uninterruptible power supply device, the static switch 50 is a transfer circuit using a thyristor or an SCR switch in which commutation is inevitable. The value of overcurrent flowing from the bypass line 20 to the inverter 30 during commutation due to calculation error caused by an offset or the like at the time of switching from the thyristor for connecting the output of the inverter 30 to the load to the thyristor for connecting the bypass line 20 to the load is shown as a graph.

The graph shows a short-circuit current flowing from the bypass line 20 to the inverter 30 and having a peak value of 7000 A and an overcurrent of 25 A before and after the short-circuit current. Damage occurs due to this short-circuit current or overcurrent.

Figure 3:
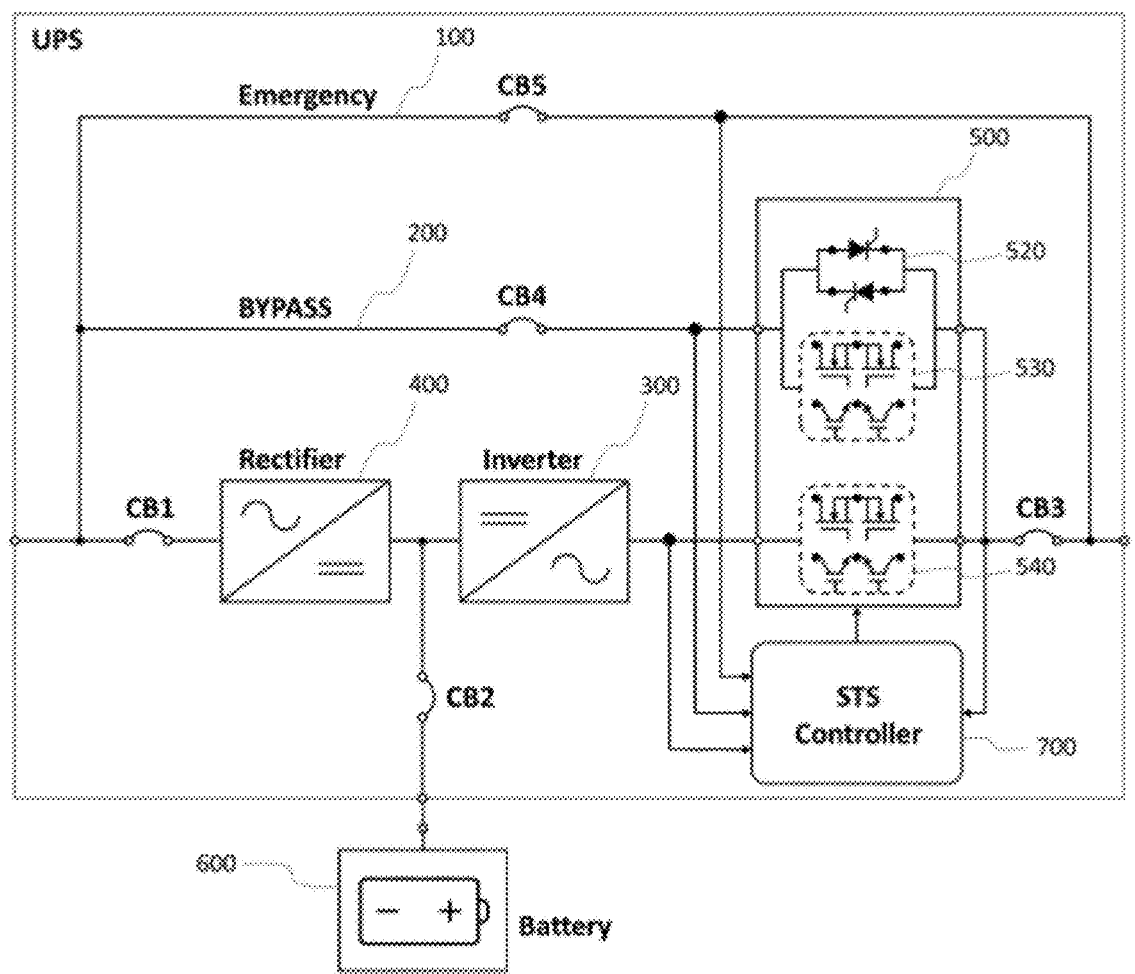
FIG. 3 illustrates an internal configuration of an uninterruptible power supply device according to an embodiment of the present invention.

FIG. 3 illustrates an internal configuration of an uninterruptible power supply device according to an embodiment of the present invention.

Referring to FIG. 3, the uninterruptible power supply device of the present invention has at least three connections by an emergency line 100, a bypass line 200, an inverter 300, and a rectifier 400 to connect one system power source 80 to a load 90.

In addition to the aforementioned three connections, additional circuit breakers CB1, CB2, CB3, CB4, and CB5 may be included, and for more stable power supply to the load, power supply by another power input may be further provided in addition to power supply by the uninterruptible power supply device.

The uninterruptible power supply device of the present invention may receive alternating current from the system power source, and the rectifier 400 may convert the alternating current into direct current and supplies the same to the inverter 300 or store the same in a battery 600.

The inverter 300 converts the direct current from the rectifier 400 or the battery 600 into alternating current required by the load and supplies the same.

In addition, the present invention includes a switching unit 500 in order to supply power from the bypass line 200 and the inverter 300 to the load, and the switching unit 500 includes a first switch for connecting the output of the inverter 300 to the load and a second switch for connecting the bypass line 200 to the load and further includes a source transfer switch (STS) controller 700 for controlling operations of the first switch and the second switch.

The first switch includes a power switching semiconductor 540 capable of active switching control, and the second switch includes an SCR switch 520 and a power switching semiconductor 530 capable of active switching control which are connected in parallel. The power switching semiconductors 530 and 540 capable of active switching control can achieve "active" switching control without an additional circuit for on/off, such as a Metal Oxide Semiconductor Field Effect Transistor (MOSFET) bidirectional switch or an Insulated Gate Bipolar Transistor (IGBT) bidirectional switch.

The power switching semiconductors 530 and 540 capable of active switching control can operate with a response time of several μs or less only by applying an on signal and an off signal thereto, unlike the SCR switch 520 that allows "passive" switching according to an additional circuit for on/off.

Before operation of the inverter 300, the SCR switch 520 of the second switch is first turned on, and then the power switching semiconductor 530 capable of active switching control is sequentially turned on in a state in which the circuit breaker CB4 of the bypass line 200 is turned on.

In a case in which a short-circuit current is generated from the load, the SCR switch 520 having a high withstand capacity is turned on first between the SCR switch 520 and the power switching semiconductor 530 capable of active switching control of the second switch, and then the power switching semiconductor 530 capable of active switching control is sequentially turned on when the current flowing through the SCR switch 520 is less than an allowable current.

The SCR switch 520 is turned on first in consideration of a high switching speed and a high withstand capacity thereof, and then the power switching semiconductor 530 capable of active switching control, which has a high switching speed but has a low withstand capacity, is turned on.

If a short-circuit occurs in the load and a short-circuit current is generated from the load, damage can be prevented by first turning on the SCR switch 520 having a high withstand capacity. In a case in which the current flowing through the SCR switch 520 is less than the allowable current, when the power switching semiconductor 530 capable of active switching control is sequentially turned on, the SCR switch 520 is turned off.

When the DC power input to the inverter 300 is within a normal range, the inverter 300 is operated such that the output voltage of the inverter 300 reaches a voltage identical to the voltage of the bypass line 200, and when the voltage of the bypass line 200 is within an allowable voltage, the power switching semiconductor 530 capable of active switching control of the second switch is turned off and the power switching semiconductor 540 capable of active switching control of the first switch is turned on within a synchronization range.

The power switching semiconductor 530 capable of active switching control of the second switch immediately cuts off connection from the bypass line 200 to the load when an off signal is applied to the gate thereof, and thus there is no possibility of overcurrent occurring from the bypass line 200 to the inverter 300.

In a case in which the voltage of the bypass line 200 is other than the allowable voltage, the power switching semiconductor 530 capable of active switching control of the second switch is turned off and the power switching semiconductor 540 capable of active switching control of the first switch is turned on such that power is supplied from the inverter 300 to the load.

At this time, transfer is performed in a state in which the power switching semiconductor 540 capable of active switching control of the first switch and the power switching semiconductor 530 capable of active switching control of the second switch are not turned on at the same time.

After operation of the inverter 300, if an abnormality occurs in the inverter 300 or the rectifier 400 and thus power is no longer supplied to the load, the STS control unit 700 applies an off signal to the gate of the power switching semiconductor 540 capable of active switching control of the first switch, and simultaneously, turns on the SCR switch 520 of the second switch, and then sequentially turns on the power switching semiconductor 530 capable of active switching control such that power is supplied to the load from the bypass line 200.

That is, when an abnormality occurs in the inverter 300 or the rectifier 400, the STS control unit 700 performs control such that an off signal is applied to the gate of the power switching semiconductor 540 capable of active switching control, and simultaneously, the SCR switch 520 of the second switch is turned on first, and then the power switching semiconductor 530 capable of active switching control is sequentially turned on in a state in which the circuit breaker CB4 of the bypass line 200 is turned on.

Consequently, the power switching semiconductor 540 capable of active switching control of the first switch immediately cuts off connection from the inverter 300 to the load when an off signal is applied to the gate thereof, and thus there is no possibility of overcurrent occurring from the bypass line 200 to the inverter 300.

After the connection from the inverter 300 to the load is cut off by the power switching semiconductor 540 capable of active switching control of the first switch, the SCR switch 520 having a high withstand capacity is turned on first between the SCR switch 520 and the power switching semiconductor 530 capable of active switching control of the second switch in a case in which a short-circuit current is generated from the load, and then the power switching semiconductor 530 capable of active switching control is sequentially turned on in a case in which the current flowing through the SCR switch 520 is less than the allowable current.

The SCR switch 520 is turned on first in consideration of the high switching speed and high withstand capacity thereof, and then the power switching semiconductor 530 capable of active switching control, which has a high switching speed but has a low withstand capacity, is turned on.

When a short-circuit occurs in the load and thus a short-circuit current is generated from the load, damage can be prevented by first turning on the SCR switch 520 having a high withstand capacity. In a case in which the current flowing through the SCR switch 520 is less than the allowable current, when the power switching semiconductor 530 capable of active switching control is sequentially turned on, the SCR switch 520 is turned off such that the inverter 300 or the rectifier 400 returns to a normal state, and thus rapid transfer can be made to supply power from the inverter 300 to the load.

In order to supply power to the load, power is detected from the bypass line 200 and the inverter 300, normal power is selected and transferred, the power from the inverter 300 is used as main power and the power from the bypass line 200 is used as secondary power, switching to the secondary power is performed if an abnormality occurs in the main power, and switching back to the main power is performed if there is no abnormality in the main power.

Figure 4:
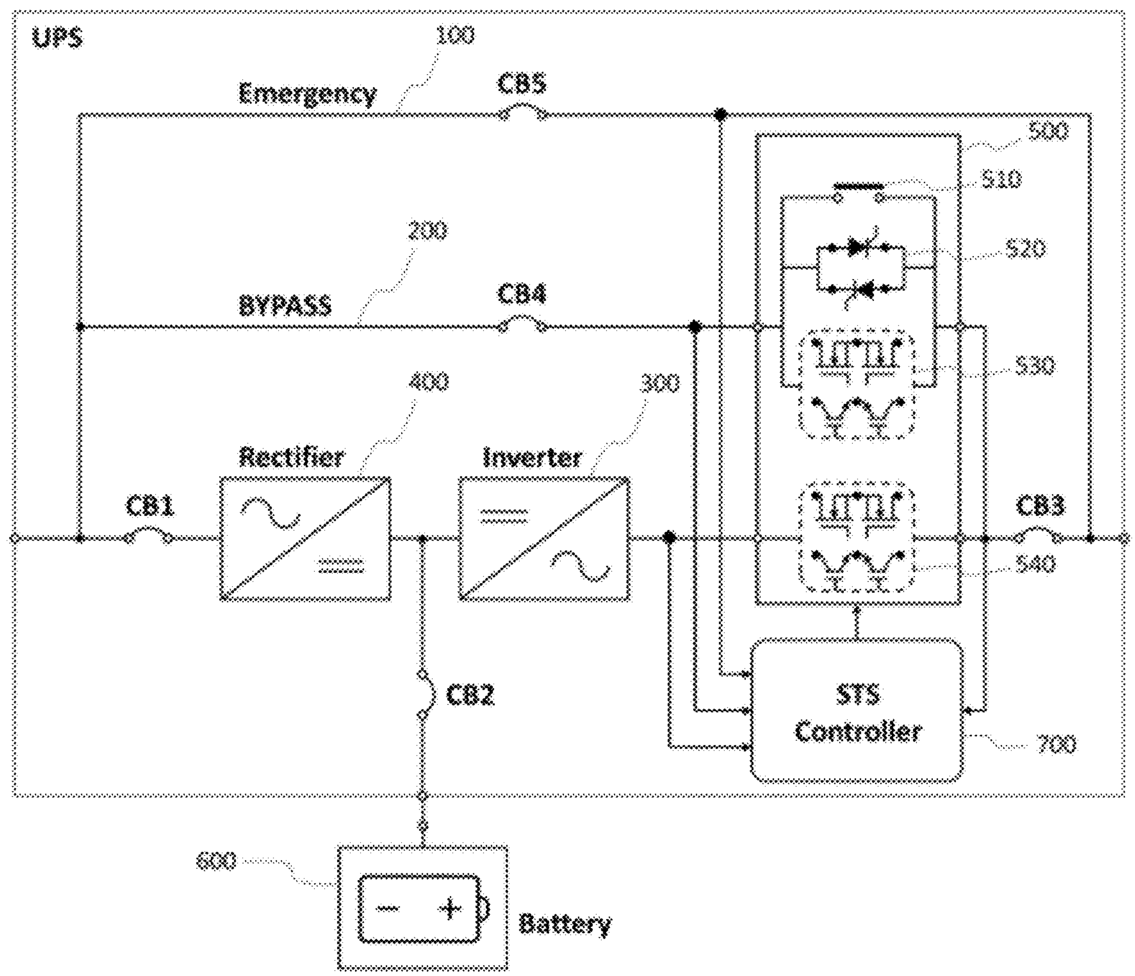
FIG. 4 illustrates an internal configuration diagram of an uninterruptible power supply device according to another embodiment of the present invention.
Figure 5:
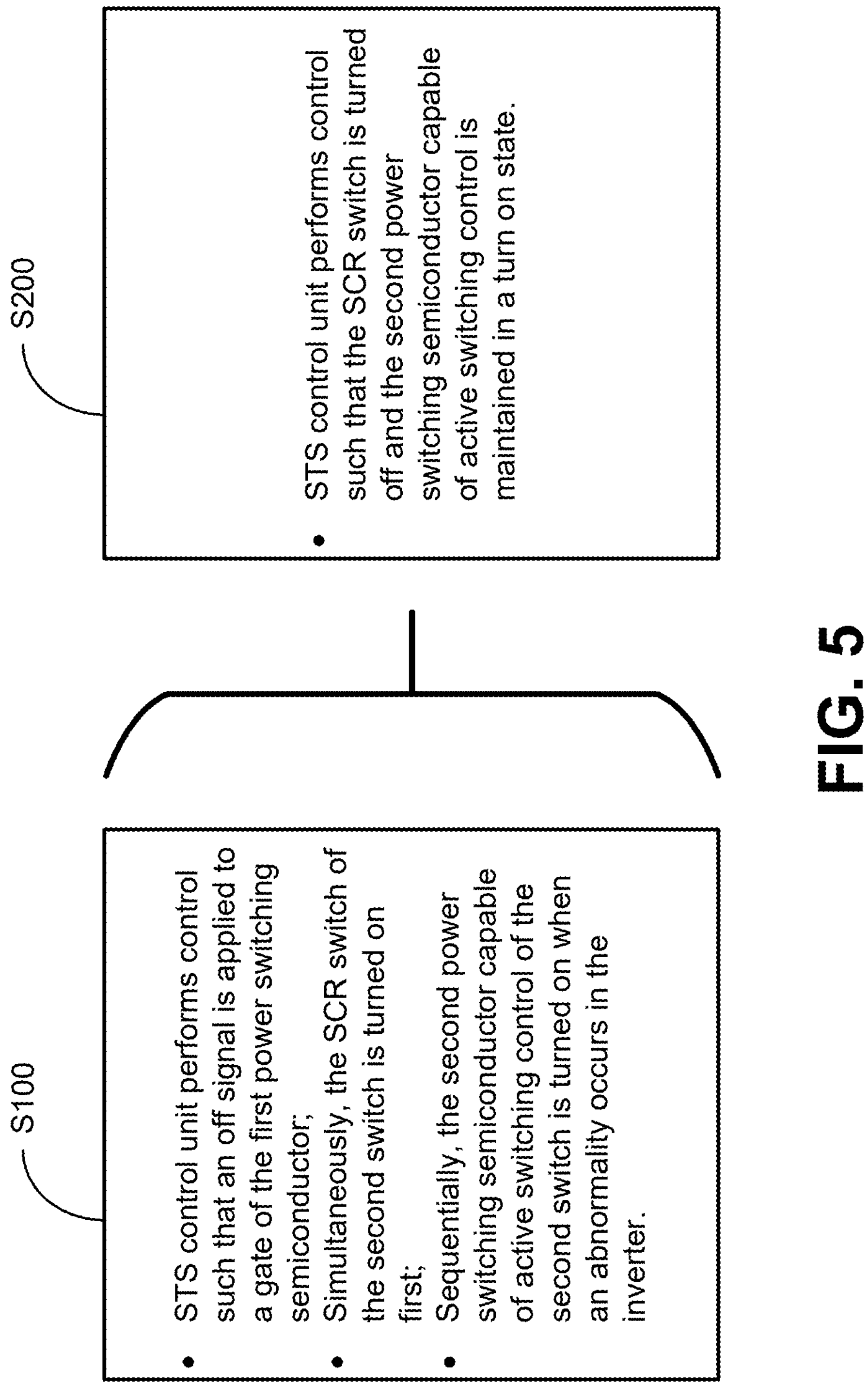
FIG. 5 illustrates steps according to another embodiment of the present invention.
Figure 6:
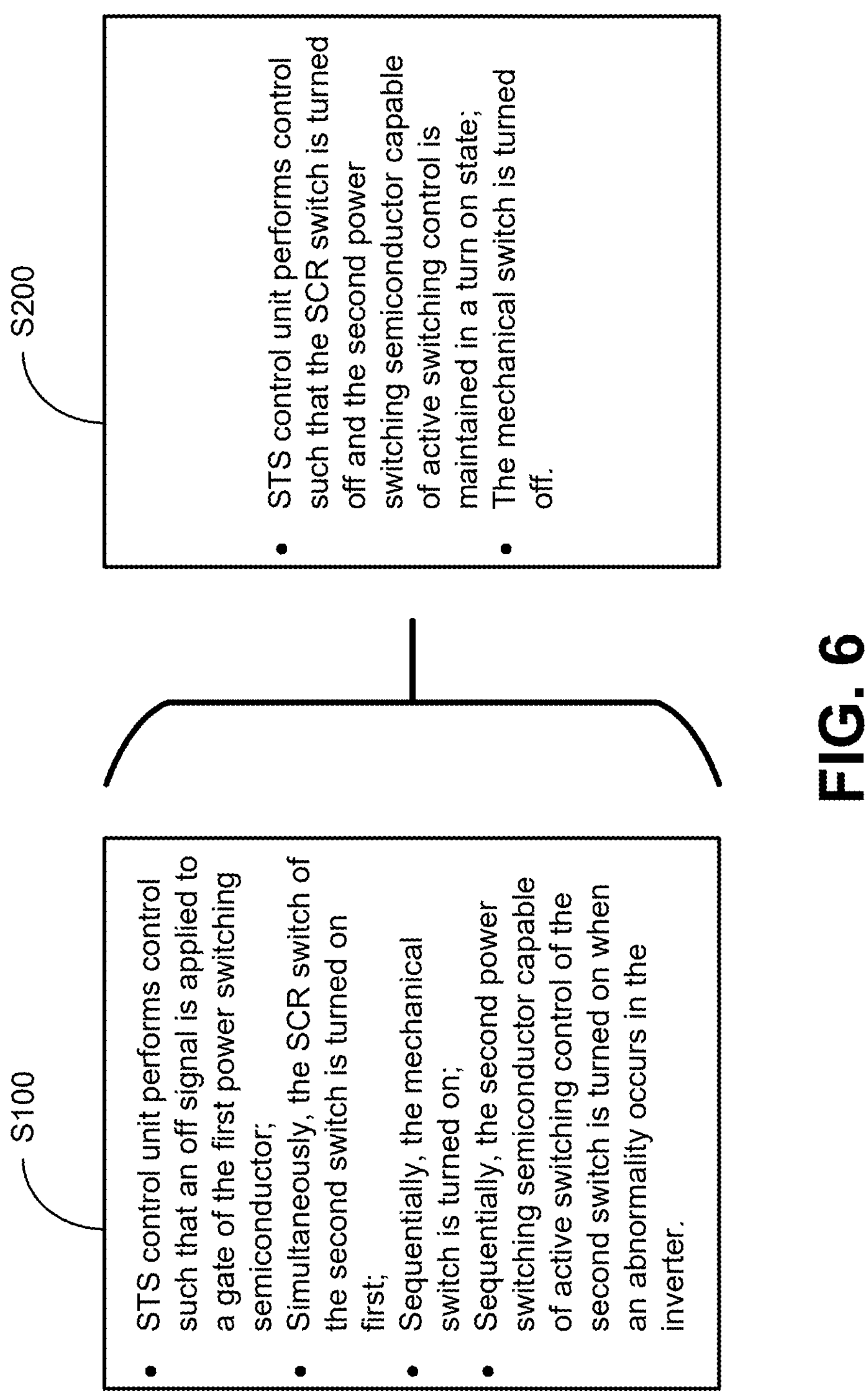
FIG. 6 illustrates additional steps according to another embodiment of the present invention.

FIG. 4 illustrates an internal configuration of an uninterruptible power supply device according to another embodiment of the present invention.

Referring to FIG. 4, compared to the uninterruptible power supply device according to an embodiment of the present invention shown in FIG. 3, the second switch of the switching unit 500 further includes a relay or magnetic contactor (MC) 510. The uninterruptible power supply device according to an embodiment of the present invention shown in FIG. 3 is small and has a low allowable current, whereas the uninterruptible power supply device according to another embodiment of the present invention shown in FIG. 4 may be applied to a large device having a high allowable current.

The uninterruptible power supply device of the present invention has at least three connections by an emergency lines (100), a bypass lines (200), an inverter (300), and a rectifier (400) in order to connect one system power source 80 to a load 90.

In addition to the aforementioned three connections, additional circuit breakers CB1, CB2, CB3, CB4, and CB5 may be included, and for more stable power supply to the load, power supply by another power input may be further provided in addition to power supply by the uninterruptible power supply device.

The uninterruptible power supply device of the present invention may receive alternating current from the system power source, and the rectifier 400 may convert the alternating current into direct current and supplies the same to the inverter 300 or store the same in a battery 600.

The inverter 300 converts the direct current from the rectifier 400 or the battery 600 into alternating current required by the load and supplies the same.

In addition, the present invention includes a switching unit 500 in order to supply power from the bypass line 200 and the inverter 300 to the load, and the switching unit 500 includes a first switch for connecting the output of the inverter 300 to the load and a second switch for connecting the bypass line 200 to the load and further includes a source transfer switch (STS) controller 700 for controlling operations of the first switch and the second switch.

The first switch includes a power switching semiconductor 540 capable of active switching control, and the second switch includes the relay or magnetic contactor (MC) 510, an SCR switch 520, and a power switching semiconductor 530 capable of active switching control which are connected in parallel.

Before operation of the inverter 300, the SCR switch 520 of the second switch is first turned on or the relay or magnetic contactor (MC) 510 is turned on, and then the power switching semiconductor 530 capable of active switching control is sequentially turned on in a state in which the circuit breaker CB4 of the bypass line 200 is turned on.

In a case in which a short-circuit current is generated from the load, the SCR switch 520 having a higher withstand capacity is turned on first or the relay or magnetic contactor (MC) 510 is turned on among the relay or magnetic contactor (MC) 510, the SCR switch 520, the power switching semiconductor 530 capable of active switching control of the second switch, and then the power switching semiconductor 530 capable of active switching control is sequentially turned on when the flowing current is less than an allowable current.

The SCR switch 520 is turned on first in consideration of the high switching speed and the high withstand capacity thereof, and then the power switching semiconductor 530 capable of active switching control, which has a high switching speed but has a low withstand capacity, may be turned on. Before the inverter 300 is operated, the relay or magnetic contactor (MC) 510 may be turned on in consideration of a low switching speed and a high withstand capacity thereof, and then the power switching semiconductor 530 capable of active switching control which has a high switching speed and a low withstand capacity may be turned on.

If a short-circuit occurs in the load and a short-circuit current is generated from the load, damage can be prevented by first turning on the SCR switch 520 having a high withstand capacity or turning on the relay or magnetic contactor (MC) 510. In a case in which the flowing current becomes less than the allowable current, when the power switching semiconductor 530 capable of active switching control is sequentially turned on, the SCR switch 520 or the relay or magnetic contactor (MC) 510 is turned off.

When the DC power input to the inverter 300 is within a normal range, the inverter 300 is operated such that the output voltage of the inverter 300 reaches a voltage identical to the voltage of the bypass line 200, and when the voltage of the bypass line 200 is within an allowable voltage, the power switching semiconductor 530 capable of active switching control of the second switch is turned off and the power switching semiconductor 540 capable of active switching control of the first switch is turned on within a synchronization range.

The power switching semiconductor 530 capable of active switching control of the second switch immediately cuts off connection from the bypass line 200 to the load when an off signal is applied to the gate thereof, and thus there is no possibility of overcurrent occurring from the bypass line 200 to the inverter 300.

In a case in which the voltage of the bypass line 200 is other than the allowable voltage, the power switching semiconductor 530 capable of active switching control of the second switch is turned off and the power switching semiconductor 540 capable of active switching control of the first switch is turned on such that power is supplied from the inverter 300 to the load.

At this time, transfer is performed in a state in which the power switching semiconductor 540 capable of active switching control of the first switch and the power switching semiconductor 530 capable of active switching control of the second switch are not turned on at the same time.

After operation of the inverter 300, if an abnormality occurs in the inverter 300 or the rectifier 400, the STS control unit 700 applies an off signal to the gate of the power switching semiconductor 540 capable of active switching control of the first switch, and simultaneously, turns on the SCR switch 520 of the second switch, and then sequentially turns on the relay or magnetic contactor (MC) 510 and the power switching semiconductor 530 capable of active switching control such that power is supplied to the load from the bypass line 200.

That is, when an abnormality occurs in the inverter 300, the STS control unit 700 performs control such that an off signal is applied to the gate of the power switching semiconductor 540 capable of active switching control, and simultaneously, the SCR switch 520 of the second switch is turned on first, and then the relay or magnetic contactor (MC) 510 and the power switching semiconductor 530 capable of active switching control are sequentially turned on in a state in which the circuit breaker CB4 of the bypass line 200 is turned on.

Consequently, the power switching semiconductor 540 capable of active switching control of the first switch immediately cuts off connection from the inverter 300 to the load when an off signal is applied to the gate thereof, and thus there is no possibility of overcurrent occurring from the bypass line 200 to the inverter 300.

After the connection from the inverter 300 to the load is cut off by the power switching semiconductor 540 capable of active switching control of the first switch, the SCR switch 520 having a high withstand capacity is turned on first between the SCR switch 520 and the power switching semiconductor 530 capable of active switching control of the second switch in a case in which a short-circuit current is generated from the load, and then the relay or magnetic contactor (MC) 510 having a higher withstand capacity is immediately turned on.

The SCR switch 520 is turned on first in consideration of the high switching speed and high withstand capacity thereof, and then the relay or magnetic contactor (MC) 510 having a low switching speed but higher withstand capacity is turned on, and the power switching semiconductor 530 capable of active switching control, which has a high switching speed but has a low withstand capacity, is turned on.

Here, in a case in which the current flowing through the SCR switch 520 and the relay or magnetic contactor (MC) 510 is less than the allowable current, the power switching semiconductor 530 capable of active switching control is turned on.

When a short-circuit occurs in the load and thus a short-circuit current is generated from the load, damage can be prevented by first turning on the SCR switch 520 having a high withstand capacity, and damage can be further prevented when even when there is a risk of overcurrent or overcurrent is detected by immediately turning on the relay or magnetic conductor (MC) 510.

Thereafter, in a case in which the current flowing through the relay or magnetic conductor (MC) 510 is less than the allowable current, the power switching semiconductor 530 capable of active switching control is sequentially turned on such that the SCR switch 520 and the relay or magnetic conductor (MC) 510 are turned off.

The present invention can prevent the system from being damaged due to abnormality in a transfer time and transfer time control between the bypass line and inverter output in the uninterruptible power supply device, minimize a configuration for heat dissipation since the SCR switch connected in parallel to the switching unit for connecting the bypass line to the load is applied for a very short time to connect to a large load, and further improve the reliability of the uninterruptible power supply device according to on/off of the user regardless of commutation since connection/disconnection between the bypass line and the inverter output is independently performed irrespective of the magnitude or phase of a load current.

In addition, since the switching unit of the present invention has a parallel structure, it can be applied to existing uninterruptible power supply devices without modification. The conventional uninterruptible power supply device can perform switching only by observing a commutation state, whereas the uninterruptible power supply device of the present invention can allow the user to freely switch between the bypass line and the inverter output at any desired time without observing commutation, thereby further improving the reliability of the product.

In addition, a method of operating the uninterruptible power supply device of the present invention can be implemented as a computer program, and each component of the present invention can be implemented as hardware or software, and thus it can be implemented as software running on a single hardware module or individual hardware. Additionally, the method of operating the uninterruptible power supply device of the present invention may be implemented by being stored in a recording medium as a computer program.

[Reference sign list]

| | |
|---|---|
| 10: Emergency line | 50: Static switch |
| 20: Bypass line | 60: Battery |
| 30: Inverter | 100: Emergency Line |
| 40: Rectifier | 200: Bypass line |
| 300: Inverter | 510: Relay or magnetic contactor (MC) |
| 400: Rectifier | |
| 500: Switching unit | 520: SCR switch |
| 530, 540: Power switching semiconductor capable of active switching control | |
| 600: Battery | 700: STS control unit |

What is claimed is:

1. An uninterruptible power supply device for connecting a power source to a load, the uninterruptible power supply device comprising:

a first switch including a first active power switching semiconductor for connecting an output of an inverter to the load, the first active power switching semiconductor being capable of performing an active power switching control including an instant off operation of the power;

a second switch including a second active power switching semiconductor and an SCR switch for connecting a bypass line from the power source to the load, the second active power switching semiconductor being capable of performing an active power switching control, the second active power switching semiconductor and the SCR switch being connected in parallel with each other; and a source transfer switch (STS) control unit coupled to the first switch and the second switch, and configured to control operations of the first switch and the second switch, wherein, when an abnormality occurs in the inverter, the STS control unit is configured to perform an operation in which an off signal is applied to a gate of the first active power switching semiconductor of the first switch to turn off the first active power switching semiconductor of the first switch instantly such that a power from the inverter to the load stops instantly, and simultaneously with applying the off signal to the gate of the first active power switching semiconductor of the first switch, turn on the SCR switch of the second switch such that the power is continuously supplied to the load from the bypass line through the SCR switch of the second switch, after the SCR switch of the second switch is turned on, the STS control unit is further configured to determine whether a current that flows through the SCR switch is less than a predetermined current, and when determined that the current through the SCR switch is less than the predetermined current, apply a on signal to a gate of the second active power switching semiconductor of the second switch to turn on the second active power switching semiconductor of the second switch such that the power is continuously supplied to the load from the bypass line through the second active power switching semiconductor of the second switch, and after the second active power switching semiconductor of the second switch is turned on, the STS control unit is further configured to turn off the SCR switch of the second switch such that the power is continuously supplied to the load from the bypass line only through the second active power switching semiconductor of the second switch.

2. The uninterruptible power supply device of claim 1, further comprising a first circuit breaker on the bypass line between the power source and the second switch, wherein, when an abnormality occurs in the inverter, the STS control unit performs control such that the second switch is turned on in a state in which the first circuit breaker of the bypass line is turned on.

3. The uninterruptible power supply device of claim 1, wherein the second switch further includes a mechanical switch, the mechanical switch being connected in parallel both with the second power switching semiconductor and the SCR switch, and the STS control unit performs control such that the mechanical switch is turned on in addition to the SCR switch when an abnormality occurs in the inverter.

4. The uninterruptible power supply device of claim 3, wherein the STS control unit performs control such that the SCR switch, the mechanical switch, and the second active power switching semiconductor of the second switch are sequentially turned on, and then the SCR switch and the mechanical switch are turned off and the second active power switching semiconductor is maintained in a turn on state while the abnormality in the inverter exists.

5. The uninterruptible power supply device of claim 4, wherein the mechanical switch is a relay or magnetic contactor (MC).

6. A method of operating an uninterruptible power supply device, the method comprising:

providing the uninterruptible power supply including:

a first switch including a first active power switching semiconductor for connecting an output of an inverter to a load, the first active power switching semiconductor being capable of performing an active power switching control including an instant off operation, a second switch including a second active power switching semiconductor and an SCR switch for connecting a bypass line from a power source to the load, the second active power switching semiconductor being capable of performing an active power switching control, the second active power switching semiconductor and the SCR switch being connected in parallel with each other, and a source transfer switch (STS) control unit coupled to the first switch and the second switch, and configured to control operations of the first switch and the second switch, when an abnormality occurs in the inverter, performing an operation by the STS control unit including applying an off signal to a gate of the first active power switching semiconductor of the first switch to turn off the first active power switching semiconductor of the first switch instantly such that a power from the inverter to the load stops instantly, and simultaneously with applying the off signal to the gate of the first active power switching semiconductor of the first switch, turning on the SCR switch of the second switch such that the power is continuously supplied to the load from the bypass line through the SCR switch of the second switch;

after turning on the SCR switch of the second, determining whether a current that flows through the SCR switch is less than a predetermined current, and when determined that the current through the SCR switch is less than the predetermined current, applying a on signal to a gate of the second active power switching semiconductor of the second switch to turn on the second active power switching semiconductor of the second switch such that the power is continuously supplied to the load from the bypass line through the second active power switching semiconductor of the second switch, and after the second active power switching semiconductor of the second switch is turned on, turning off the SCR switch of the second switch such that the power is continuously supplied to the load from the bypass line only through the second active power switching semiconductor of the second switch.

7. A computer program stored in a storage medium to execute the method of operating an uninterruptible power supply device of claim 6.

8. The method of claim 6, wherein the uninterruptible power supply device further comprises a mechanical switch connected in parallel both with the second power switching semiconductor and the SCR switch, the method further comprising:

after turning on the SCR switch of the second switch, sequentially turning on the mechanical switch and then the second power switching semiconductor of the second switch.

9. The uninterruptible power supply device according to claim 1, wherein each of the first active power switching semiconductor and the second power switching semiconductor is a bidirectional switch such as a MOSFET (Metal Oxide Semiconductor Field Effect Transistor) switch or an IGBT (Insulated Gate Bipolar Transistor) switch.

* * * * *